United States Patent [19]

Barclay

[11] Patent Number: 4,755,841
[45] Date of Patent: Jul. 5, 1988

[54] METHOD OF INITIALIZING A FRAME COUNTER

[75] Inventor: David Barclay, Bergen, N.Y.

[73] Assignee: Eastman Kodak Company, Rochester, N.Y.

[21] Appl. No.: 141,166

[22] Filed: Jan. 6, 1988

[51] Int. Cl.⁴ ............................................. G03B 17/36
[52] U.S. Cl. ...................................... 354/217; 354/214
[58] Field of Search ............. 354/214, 215, 217, 173.1

[56] References Cited

U.S. PATENT DOCUMENTS

| | | | |
|---|---|---|---|
| 2,629,563 | 2/1953 | Kesel et al. | 242/71 |
| 3,136,291 | 6/1964 | Irisawa et al. | 354/215 |
| 3,892,354 | 7/1975 | Nago et al. | 354/217 |
| 4,540,261 | 9/1985 | Matsumoto et al. | 354/173.11 |
| 4,610,522 | 9/1986 | Tobioka et al. | 354/173.1 |
| 4,676,621 | 6/1987 | Desormeaux | 354/217 |
| 4,707,096 | 11/1987 | Lawther | 354/215 |

FOREIGN PATENT DOCUMENTS 57-55614 12/1982 Japan .

Primary Examiner—A. A. Mathews
Attorney, Agent, or Firm—Roger A. Fields

[57] ABSTRACT

A frame counter in a disposable single-use camera is initialized to a preliminary setting from a random setting, rather than from a predetermined setting as in prior art counters. According to the disclosed method, an actuator is rotated in engagement with successive teeth of the frame counter during factory prewinding of an unexposed filmstrip onto a take-up spool to rotate the counter to its preliminary setting from any other setting. After the counter is initialized to the preliminary setting, the actuator continues to rotate in the same direction during continued prewinding of the filmstrip, but it is rotated substantially within a space between two of the teeth of the counter to prevent it from engaging anyone of the teeth to rotate the counter out of the preliminary setting. Thus the counter remains initialized.

3 Claims, 2 Drawing Sheets

METHOD OF INITIALIZING A FRAME COUNTER

CROSS-REFERENCE TO A RELATED APPLICATION

Reference is made to commonly assigned, copending U.S. application Ser. No. 141,434, filed Jan. 6, 1988 in the names of David Barclay and Lee D. Oldfield and entitled APPARATUS FOR INITIALIZING A FRAME COUNTER FROM A RANDOM SETTING.

BACKGROUND OF THE INVENTION

1. Field of the Invention

The invention relates generally to the field of photography, and more particularly to a method of initializing a frame or exposure counter in a camera to a preliminary setting.

2. Description of the Prior Art

A frame or exposure counter is a measuring mechanism built into certain cameras to indicate to the user the actual member of individual frames of the filmstrip exposed or remaining to be exposed. Typically, the frame counter comprises a counter dial having thirty-six evenly spaced numbered settings designated by the numbers "1, 2, 3, 4, 5 ... 36" imprinted on the dial at corresponding locations and a preliminary setting designated by a mark or a letter imprinted on the dial at a predetermined location spaced from the "1" by the equivalent of one or two of the numbered settings. The numbers "1"–"36" indicate successive frames of the filmstrip and the mark or letter corresponds to a limited section of the filmstrip, preceding the first frame, which is exposed preparatory to taking the first picture. Often, it is advised to take one or two blank exposures (with the lens covered) before taking the first picture, to ensure that the filmstrip is properly threaded onto a take-up spool in the camera. Thus after taking the blank exposure(s) the counter dial will have been incremented from its preliminary setting to its "1" setting.

Recently a disposable single-use camera referred to as the "Quick Snap" was introduced by Fuji Photo Film Co. Ltd. At the manufacturer, the camera is loaded with a conventional 24-exposure 35 mm film cartridge and substantially the entire length of the unexposed filmstrip is factory prewound from the cartridge onto a take-up spool. A metering sprocket in engagement with the unexposed filmstrip is rotated during the prewinding operation to rotate an actuator in engagement with respective teeth of a counter dial to, in turn, increment the counter dial from its "1" setting to an "S" setting, following the "24" setting. This is done to initialize the frame counter to the "S" setting. Then, one or two blank exposures are taken, and the counter dial is returned to its "24" setting.

After you take a picture using the "Quick Snap", a thumbwheel engaging a film spool in the cartridge is manually rotated to rewind the exposure into the cartridge. The rewinding movement of the filmstrip the equivalent of one frame rotates the metering sprocket to decrement the counter dial to its next lower numbered setting. When substantially the entire length of the filmstrip is exposed and rewound into the cartridge, the camera is sent to a photofinisher who removes the filmstrip for processing and tosses away the camera.

In the "Quick Snap", the counter dial must be initialized to its "S" setting from a predetermined original setting, such as its "1" setting. Thus during factory prewinding of the filmstrip onto the take-up spool special care must be taken by the manufacturer to make sure that the counter dial is at its predetermined original setting before the prewinding operation is begun. Otherwise, the counter dial will provide an incorrect indication of the frame count.

SUMMARY OF THE INVENTION

The invention is believed to solve the above-described probelm regarding initialization of a frame counter to a preliminary setting.

According to the invention there is provided a method of initializing a frame counter in a disposable single-use camera to a preliminary setting from a random setting, wherein the camera is generally of the type including an actuator rotated in engagement with respective teeth of the counter during film movement between a film cartridge and a take-up spool to rotate the counter to successive settings including its preliminary setting, and wherein the steps of said method comprise:

rotating the take-up spool to factory prewind substantially the entire length of an unexposed filmstrip from the film cartridge onto the take-up spool;

rotating the actuator in engagement with successive teeth of the counter during prewinding movement of the unexposed filmstrip to rotate the counter to its preliminay setting from any other setting, to initialize the counter; and continuing to rotate the actuator in the smae direction during continued prewinding movement of the unexposed filmstrip after the counter is initialized to its preliminary setting, but substantially within a space located between two of the teeth to prevent the actuator from engaging anyone of the teeth to rotate the counter out of the preliminary setting, whereby the counter will remain initialized.

Since the method of initializing the frame counter to its preliminary setting calls for the counter to be initialized from a random setting, the operation is made relatively simple and is not subject to error as in the prior art example of the "Quick Snap".

THE CROSS-REFERENCED APPLICATION

As compared to the method of initializing a frame counter according to the invention, the application cross-referenced above discloses apparatus for initializing a frame counter.

In the cross-referenced application, to initialize a frame counter from a random setting during factory prewinding of an unexposed filmstrip onto a take-up spool, the counter includes an elongate rise located between two of its teeth. When the counter is rotated sufficiently in a prewinding direction to locate the elongate rise immediately ahead of the actuator, the counter is initialized. Since the actuator cannot surmount the elongate rise, continued rotation of the actuator in a prewinding direction will not rotate the counter to another setting. Thus, as the filmstrip continues to be factory prewound onto the take-up spool the counter remains initialized.

DESCRIPTION OF THE PREFERRED EMBODIMENT

The invention is disclosed in connection with a 35 mm type camera. Because such a camera is widely known, this description is directed in particular to photographic elements forming part of or cooperating directly with the invention. It is to be understood, however, that other elements not specifically shown or described may take various forms known to persons of ordinary skill in the art.

Figure 1:
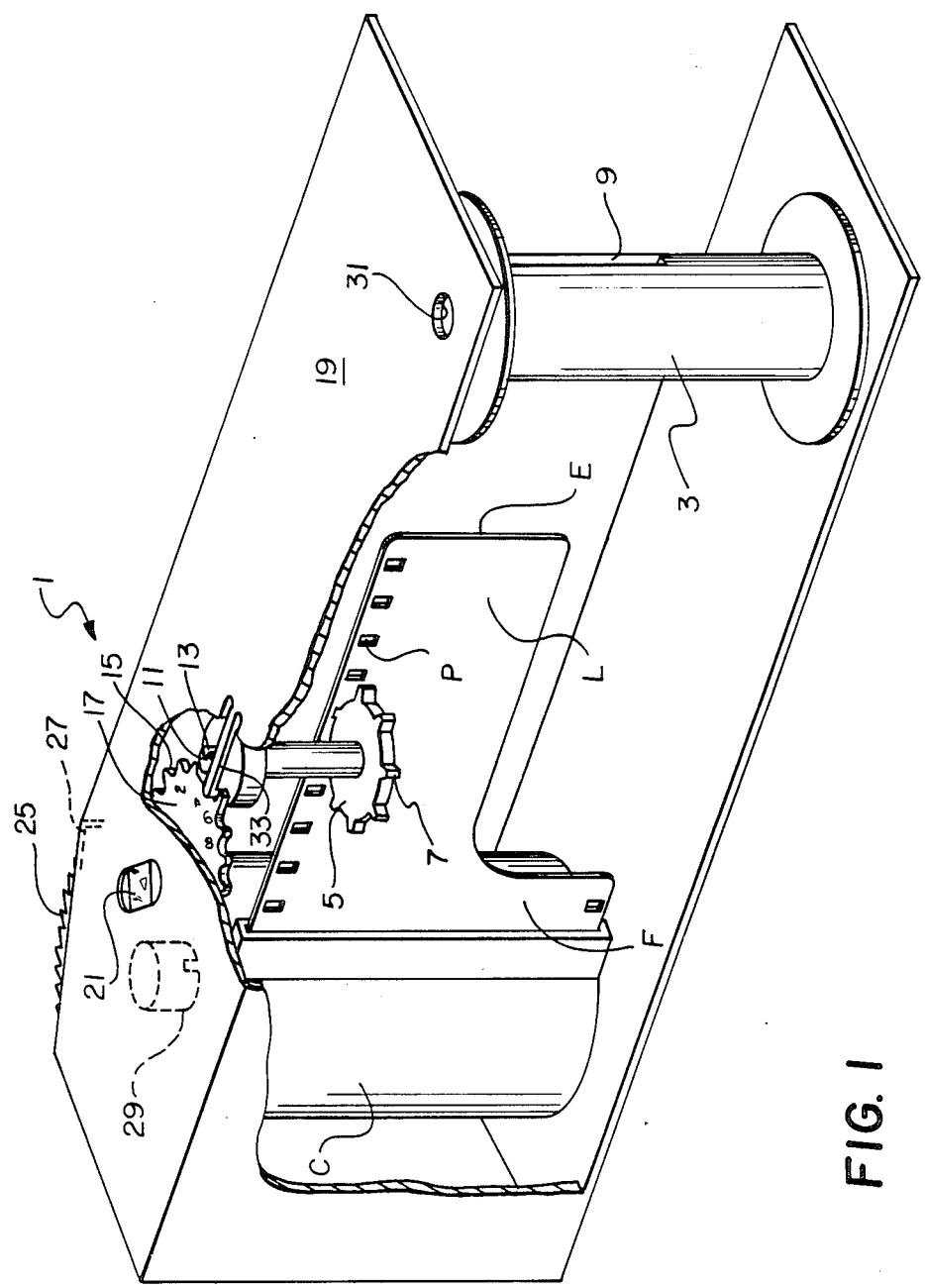
FIG. 1 is a perspective front view of the interior of a disposable single-use camera which includes a frame counter.

Referring now to the drawings and in particular to FIGS. 1, there is shown certain elements of a disposable single-use camera 1 in which substantially the entire length of an unexposed filmstrip F is prewound from a conventional 24-exposure 35 mm film cartridge C onto a take-up spool or drum 3 before any exposures are taken. Then, after each exposure, the filmstrip F is rewound one frame at a time back into the cartridge C.

When the cartridge C is loaded in the camera 1, as shown in FIG. 1, a leader section L of the unexposed filmstrip F is placed over a conventional metering sprocket 5 to position one or more perforations P in the filmstrip in engagement wiht respective peripheral teeth 7 of the sprocket, and a forward end portion E of the film leader is inserted into a slot 9 in the take-up spool 3 to secure the film leader to the take-up spool. During rotation of the take-up spool 3 to prewind substantially the entire length of the filmstrip F from the cartridge C onto the spool, the metering sprocket 5 is rotated a single revolution each time an individual frame is wound onto the spool.

Figure 2:
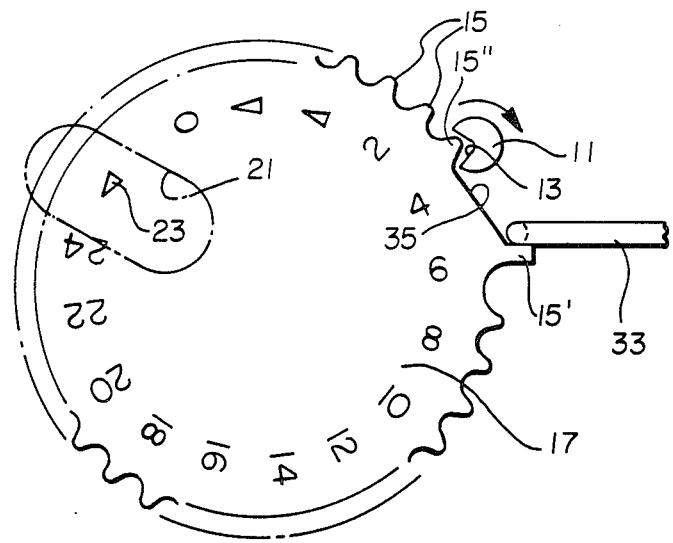
FIGS. 2 and 3 are plan views of the frame counter, depicting successive steps of a method to initialize the counter in accordance with a preferred embodiment of the invention.

An actuator 11 is coaxially fixed to the metering sprocket 5 and has a single recess 13 for receiving respective peripheral teeth 15 of a counter disk 17 to periodically engage the actuator with successive ones of the teeth as the sprocket is rotated. The counter disk 17 is rotatably mounted beneath a top body portion 19 of the camera 1 and is partially visible through a window 21 in the top body portion. As shown in FIGS. 1 and 2, the counter disk 17 has 24 evenly spaced settings, every other one of which is designated by an even number from "2" to "24" imprinted on the disk at corresponding locations, and a preliminary setting designated by a triangular mark 23 imprinted on the disk at a predetermined location spaced from the "24" by the equivalent of two of the settings. The numbers "2" to "24" indicate every other one of the successive frames of the filmstrip F and the triangular mark 23 corresponds to a limited section of the filmstrip, following the twenty-fourth frame, which is exposed before taking the first picture. Each time the metering sprocket 5 is rotated a single revolution, the actuator 11 is similarly rotated to index the counter disk 17 to another setting, visible in the window 21.

To rewind the filmstrip F back into the cartridge C after each exposure, there is provided a conventional manual rewind knob 25 located beneath the top body portion 19 of the camera 1 and accessible at a slot 27 in the top body portion. As shown in FIG. 1, the knob 25 has a depending coaxially fixed shaft 29 which engages a film spool (not shown) of the cartridge C to rotate the spool.

METHOD OF INITIALIZATION

At the manufacturer, the take-up spool 3 is engaged with a screwdriver or other implement, inserted through an acess opening 31 in the top body portion 19 of the camera 1, to rotate the spool to factory prewind substantially the entire length of the unexposed filmstrip F from the cartridge C onto the spool. After the prewinding operation is completed, the access opening 31 is plugged.

The metering sprocket 5 is rotated in engagement with the unexposed filmstrip F during prewinding movement of the filmstrip to rotate the actuator 11 in a clockwise direction in FIG. 2. In turn, the actuator 11 engages successive ones of the teeth 15 of the counter disk 17 to rotate the disk in a counterclockwise direction in FIG. 2. This indexes the counter disk 17 to the respective settings, visible in the window 21.

When the counter disk 17 is initialized to its preliminary setting indicated by the mark 23, as shown in FIG. 2, a tooth 15' of the disk slightly longer than the other teeth 15 of the disk is moved into abutment against a spring finger 33 secured to the underside of the top body portion 19 of the camera 1.

Figure 3:
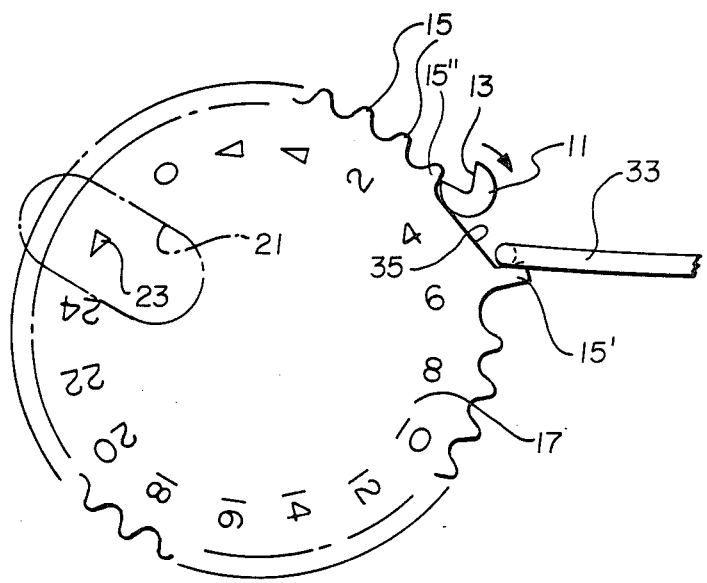

Continued rotation of the actuator 11 in the clockwise direction in FIG. 3 during continued prewinding movement of the unexposed filmstrip F, after the counter disk 17 is initialized to its preliminary setting, has no effect on the counter disk 17. The counter disk 17 essentially remains in place. That is, it is not rotated out of the preliminary setting. This is because the abutment of the tooth 15' of the counter disk 17 with the spring finger 33 causes the actuator 11 to repeatedly bump against the tooth 15" of the disk as the actuator continues to rotate in the clockwise direction in FIG. 3. Consequently, the actuator 11 cannot engage the tooth 15', and it merely rotates substantially within a space 35 located between that tooth and the tooth 15".

Since the actuator 11 is caused to rotate substantially within the space 35 located between the two teeth 15' and 15" of the counter disk 17 when the actuator continues to rotate in a clockwise direction in FIG. 3, during continued prewinding movement of the unexposed filmstrip F, it is possible to initialize the disk to the preliminary setting from any other of its settings, i.e., from a random setting. There is no need to position the counter disk 17 in a predetermined starting setting before the prewinding operation is begun as in prior art frame counters.

OPERATION OF THE CAMERA

Before taking the first picture, two blank exposures are taken (with the lens covered) to index the counter disk 17 from its preliminary setting to its "24" setting and to ensure that the camera 1 is working properly. After each exposure, the manual rewind knob 25 must be rotated to wind an individual frame into the cartridge C. When the actuator 11 is first rotated in a counterclockwise direction in FIG. 3 during initial rewinding movement of the filmstrip F, the force of the spring finger 33 against the tooth 15' of the counter disk 17 enables the actuator to engage the tooth 15" of the disk to begin clockwise rotation of the disk in FIG. 3.

When the filmstrip F is completely exposed and rewound back into the cartridge C, the counter disk 17 will be decremented to a "0" setting. Then, the camera 1 is sent to a photofinisher who removes the filmstrip for processing and tosses away the camera.

The invention has been described with reference to a preferred embodiment. However, it will be appreciated that variations and modifications can be effected within the ordinary skill in the art without departing from the scope of the invention.

I claim:

1. A method of initializing a frame counter in a disposable single-use camera to a preliminary setting from a random setting, wherein the camera is generally of the type including an actuator rotated in engagement with respective teeth of the counter during film movement between a film cartridge and a take-up spool to rotate the counter to successive settings including its preliminary setting, and wherein the steps of said method comprise:

rotating the take-up spool to factory prewind substantially the entire length of an unexposed filmstrip from the film cartridge onto the take-up spool;

rotating the actuator in engagement with successive teeth of the counter during prewinding movement of the unexposed filmstrip to rotate the counter to its preliminary setting from any other setting, to initialize the counter; and continuing to rotate the actuator in the same direction during continued prewinding movement of the unexposed filmstrip after the counter is initialized to its preliminary setting, but substantially within a space located between two of the teeth to prevent the actuator from engaging anyone of the teeth to rotate the counter out of the preliminary setting, whereby the counter will remain initialized.

2. The method as recited in claim 1, wherein the counter is incremented from a random setting to its preliminary setting during factory prewinding of the unexposed filmstrip onto the take-up spool.

3. The method as recited in claim 1, wherein the take-up spool is manually rotated to factory prewind the unexposed filmstrip onto the take-up spool.

* * * * *